US008469597B2

(12) United States Patent
Smith et al.

(10) Patent No.: US 8,469,597 B2
(45) Date of Patent: Jun. 25, 2013

(54) ACTIVE PRELOAD CONTROL FOR ROLLING ELEMENT BEARINGS

(75) Inventors: Dennis Wayne Smith, Phoenix, AZ (US); James Hanks, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 1241 days.

(21) Appl. No.: 12/104,430

(22) Filed: Apr. 16, 2008

(65) Prior Publication Data

US 2009/0263062 A1    Oct. 22, 2009

(51) Int. Cl.
*F16C 23/00*   (2006.01)
*F16C 19/50*   (2006.01)
*F16C 32/00*   (2006.01)

(52) U.S. Cl.
USPC ............................. 384/519; 384/476; 384/448

(58) Field of Classification Search
USPC ................. 384/278, 493, 557, 605, 905, 519, 384/517, 563, 448, 313–317, 476; 165/185
See application file for complete search history.

(56) References Cited

U.S. PATENT DOCUMENTS

| | | | |
|---|---|---|---|
| 3,418,809 A | 12/1968 | Kopp | |
| 4,657,412 A * | 4/1987 | McLarty et al. | 384/447 |
| 5,316,393 A | 5/1994 | Daugherty | 384/517 |
| 5,877,433 A | 3/1999 | Matsuzaki | 73/862.381 |
| 6,135,641 A * | 10/2000 | Smith | 384/493 |
| 6,293,703 B1 * | 9/2001 | Date | 384/476 |
| 6,409,390 B1 | 6/2002 | Bouzakis | 384/517 |
| 6,460,423 B1 | 10/2002 | Keller | 73/862.49 |
| 6,505,968 B1 | 1/2003 | Fleury et al. | |
| 6,796,031 B1 | 9/2004 | Russell | 29/898.09 |
| 6,913,390 B2 * | 7/2005 | Inoue et al. | 384/476 |
| 6,971,802 B2 | 12/2005 | Vezina | 384/517 |
| 7,082,772 B2 * | 8/2006 | Welch | 62/3.2 |
| 7,178,987 B2 | 2/2007 | Bridges | 384/475 |
| 2004/0263024 A1 | 12/2004 | Meffe et al. | |
| 2006/0133706 A1 * | 6/2006 | Okada et al. | 384/448 |

FOREIGN PATENT DOCUMENTS

| | | |
|---|---|---|
| EP | 1635079 | 3/2006 |
| EP | 1717467 | 11/2006 |
| GB | 1535163 | 11/1975 |
| JP | 59144818 A * | 8/1984 |
| JP | 2001054803 | 2/2001 |
| JP | 2006064127 | 3/2006 |
| WO | WO 2008041919 A1 * | 4/2008 |

OTHER PUBLICATIONS

European Patent Office, "European Search Report", May 27, 2009, Published in: EP.

* cited by examiner

*Primary Examiner* — Alan Waits
(74) *Attorney, Agent, or Firm* — Ingrassia Fisher & Lorenz, P.C.

(57) ABSTRACT

A method and apparatus for controlling the preload of duplex rolling element bearings systems under various temperatures is described. A spacer or a plurality of spacers may be located adjacent to the rings of the duplex rolling element bearings. The spacer or spacers may be heated or cooled to increase or decrease the axial dimension of the spacer or spacers. Changing the axial dimension of the spacers changes the preload of the duplex rolling element bearing system. The preload of the system may be estimated by receiving an input from a sensor or sensors located on the duplex rolling element bearings system. The sensor may be a temperature sensor or a force transducer.

16 Claims, 11 Drawing Sheets

ACTIVE PRELOAD CONTROL FOR ROLLING ELEMENT BEARINGS

FIELD OF THE INVENTION

The present invention relates generally to a method and apparatus for controlling the preload of rolling element bearings. More particularly, the invention relates to actively controlling the preload of rolling element bearings by monitoring the preload and adjusting the size of spacers in the rolling element bearings to achieve the desired preload.

BACKGROUND

Rolling element bearings are used in a variety of applications. Bearings are often preloaded, which requires the application of an axial force on the bearings. This preload allows the bearings to maintain acceptable stiffness and minimizes vibrations and noise of the bearings in the presence of an axial clearance or other slight misalignments caused by wear, thermal expansion, or tolerances. Proper levels of preload may increase bearing fatigue life, give predictable levels of system rigidity, control ball skidding under high acceleration, and reduce repetitive run-out. However, it is important to maintain the desired preload levels, as problems may occur when preload levels are too high or too low. When preload levels are too high, the bearings may experience problems such as a shortened life due to high level of fatigue on the bearings, increased noise, and increased torque levels. When preload levels are too low, the bearings may have fretting corrosion caused by vibrations of the bearing elements. Therefore, it is important to maintain acceptable levels of preload for each bearing throughout the entire range of operating conditions specified for each bearing.

In many of these applications, such as in the aviation and spacecraft industries, it is desirable that the system components be as lightweight as possible. Bearings are often constructed of different types of materials to satisfy the need for low-weight but durable assembly components. For instance, hybrid bearings having steel rings and ceramic rolling elements have been developed. Steel is used for the rings of the rolling element bearings, because the rings of rolling element bearings typically experience tensile stresses when interference fitted onto a shaft. The rolling elements of the bearings do not experience tensile stresses like the bearing rings, and may be constructed of a lighter-weight material that may have good performance characteristics in compression. One material which is used to construct these rolling elements is a ceramic material, which is lightweight, durable, and has low rolling friction.

Using two different types of materials for bearings elements is beneficial for increasing the life and reducing the overall weight of the system. However, because these rolling elements must perform at a wide range of operating temperatures, problems arise because the materials have different rates of thermal expansion. For instance, steel may have a coefficient of thermal expansion (CTE) of 5.6 μin/in*° F., while the ceramic rolling element may have a much lower CTE of approximately 1.6 μin/in*° F. The differences in the rates of thermal expansion cause changes to the preload when the bearings undergo changes in operating temperatures. For instance, bearings elements designed to operate in space may have operating temperature ranges of 180° F. to −65° F. For systems operating under large temperature fluctuations, problems may arise because of changing preloads due to the differing rates of thermal expansion of the bearing rings and the bearing rolling elements.

Methods of passively controlling preloads have been developed, such as those disclosed in U.S. Pat. No. 6,135,641. However, these methods still rely on analytical predictions to control bearing preloads.

Therefore, an improved method of controlling preload levels for hybrid rolling elements bearings is needed.

SUMMARY

A method and apparatus for controlling the preload of duplex rolling element bearings systems under various temperatures is described. Duplex rolling element bearings systems may have two rolling element bearings having a preload. A spacer or a plurality of spacers having different coefficients of thermal expansion may be located between the rings of the duplex rolling element bearings. The spacer or spacers may be heated or cooled to increase or decrease the axial dimension of the spacer or spacers. By changing the axial dimension of the spacers, the preload of the system may be controlled.

The preload of the system may be estimated by receiving an input from a sensor or sensors located on the duplex rolling element bearings system. The sensor or sensors may be a temperature sensor or a force transducer. By sensing the preload of the system and heating or cooling the spacer or spacers accordingly, a high degree of control may be achieved over the preload variations as a function of temperature in the duplex rolling element bearings system.

By controlling the preload of the system, stresses on the system may be reduced. The fatigue, drag torque, and noise of the system may also be reduced. Therefore, the components of the rolling element bearing system may experience a longer life expectancy. Additionally, because the components of the rolling element bearing systems may be subjected to lower levels of system stresses, they may be designed having a lower weight. This may provide higher efficiencies for the system into which the duplex rolling element bearing system is incorporated. Also, this may provide an advantage for aircraft and spacecraft that require low overall system mass.

The method and apparatus may be used for a variety of different configurations of rolling element bearing systems, such as dual face-to-face bearings, dual back-to-back bearings, as well as other duplex bearing configurations. The method and apparatus may be used for systems in which the inner rings or the outer rings rotate around a central axis.

A variety of control methods may be employed to control the preload of the system. The preload control system may be incorporated into the on-board computer of the apparatus into which the duplex rolling element bearing system is installed, it may be a control card dedicated to the rolling element bearing system, or it may be composed of relays and switches.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

An improved apparatus and method for controlling preload levels of rolling element bearings is described. The method and apparatus include providing at least one spacer along the rings of rolling element bearings in which two bearings are preloaded together. The spacer or spacers may be heated and cooled as needed to maintain desired levels of preload in the bearings at various operating temperatures. The preload may be predicted based on a temperature or force sensor in the preload path.

Figure 1A:
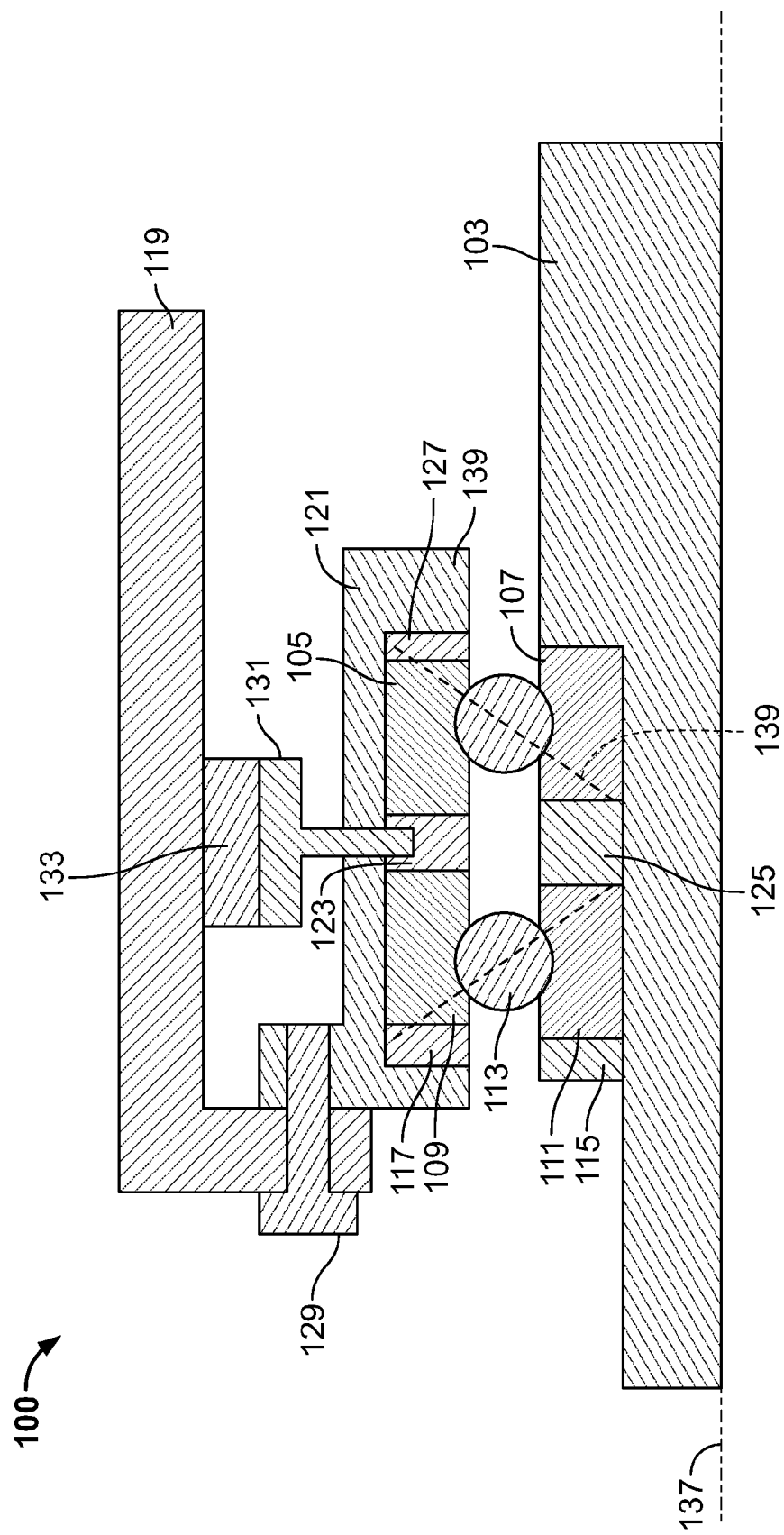
FIG. 1 is a cutaway view of rolling element bearing, according to a first embodiment.

FIG. 1a shows a cutaway view of a preloaded bearing system 100. The bearings rotate around the rotational axis 137. The bearings are symmetrically disposed around the rotational axis 137. The first bearing has a first inner ring 107, a first outer ring 105, and a plurality of rolling elements 113. The second bearing has a second inner ring 111, a second outer ring 109, and a plurality of rolling elements 113. The rolling elements 113 allow the rotation of the inner rings 107, 111 relative to the outer rings 105, 109 around the rotational axis 137. The inner and outer rings 105, 107, 109, 111 may be composed of steel. One type of steel which may be used for the rings 105, 107, 109, 111 is a 440 steel having a CTE of approximately 5.6 μin/in/° F. The rolling elements 113 may be composed of a ceramic material having a low CTE, for example, silicon nitride having a CTE of 1.6 μin/in/° F. Because the rings 105, 107, 109, 111 and the rolling elements 113 have very different CTEs, the preload in these bearing may vary greatly as a function of temperature.

The first and second bearings may be a pair of duplex preloaded hybrid rolling element bearings. The first and second bearings may be duplex face to face (DF) or duplex back to back (DB) rolling element bearings, or any other type of duplex preloaded hybrid rolling element bearings.

Duplex bearings may be preloaded together in a variety of ways well known in the art. For example, DF bearings may be preloaded by applying a relative inward force to both outer faces of the outer rings 105, 109. This may be accomplished by applying a clamping force to the outside faces of the outer rings 105, 109, by inserting a spacer between the inner rings 107, 111 to provide an outward displacement of the inner rings 107, 111 in relation to the outer rings 105, 109, by locating a spacer along at least one outer face of the outer rings 107, 111 to provide an inward displacement of the outer rings 105, 109 in relation to the inner rings 107, 111, or by any other method known in the art. By preloading the bearings in a DF configuration, the rolling elements 113 may undergo a preload along the DF preload lines 139, shown in FIG. 1a.

Figure 1B:
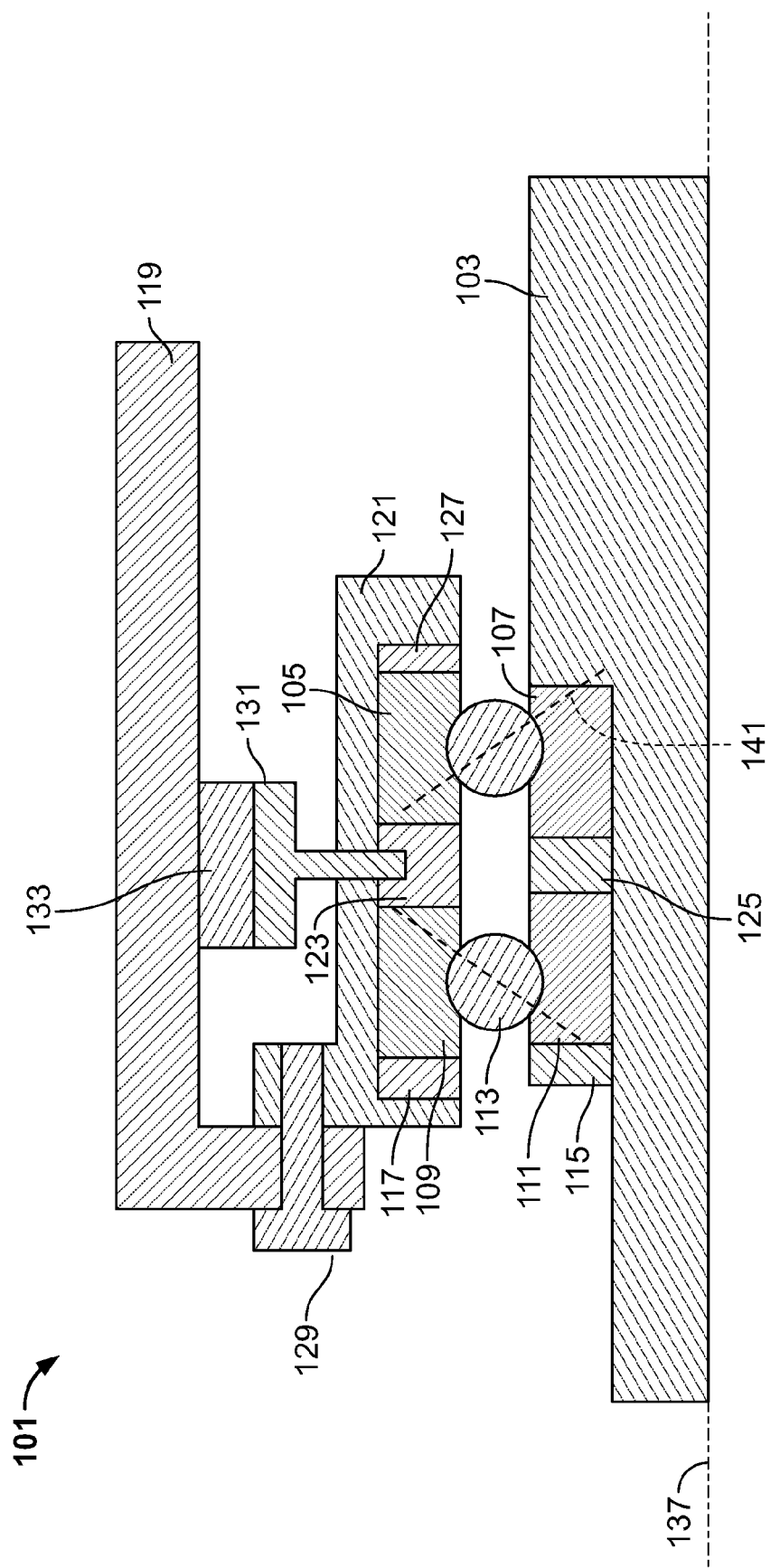

Referring to FIG. 1b, the preloaded bearing system 101 has DB bearings, which may be preloaded by applying a relative inward force to both outer faces of the inner rings 107, 111. This may be accomplished by applying a clamping force to the outside faces of the inner rings 107, 111, by inserting a spacer between the outer rings 105, 109 to provide an outward displacement of the outer rings 105, 109 in relation to the inner rings 107, 111, by locating a spacer along at least one outer face of the inner rings 107, 111 to provide an inward displacement of the inner rings 107, 111 in relation to the outer rings 105, 109, or by any other method known in the art. By preloading the bearings in a DB configuration, the rolling elements 113 may undergo a preload along the DB preload lines 141, shown in FIG. 1b.

Each of the systems of FIGS. 1a, 1b, and 3-9 may be preloaded according to any method of preloading duplex rolling element bearings known to those of skill in the art, and should not be limited to any single method of preloading duplex rolling element bearings.

In the environment of space, the preloaded bearing system 101 may be subjected to extreme temperature fluctuations, which may be in the range of approximately −65° F. to 180° F. Because the components of the preloaded bearing system 101 have different CTE's, the components may expand and contract at different rates. These differing rates of expansion and contraction cause changes in the alignment of the components, and may introduce additional stresses on the preloaded bearing system 101. Additionally, the differing rates of expansion and contraction may also change the preload of the preloaded bearing system 101, causing the problems associated with improper preload as discussed previously.

Referring again to FIG. 1a, the preloaded bearing system 101 has fixed outer rings and inner rings that rotate with the shaft 103.

A bearing cartridge 121 may be located around the first and second bearings. The first and second bearings may be installed so that the outer rings 105, 109 are located inside the bearing cartridge 121. The bearing cartridge 121 may have a bearing cartridge protrusion 139 extending from the body of the bearing cartridge 121 in a direction perpendicular to the rotational axis 137. The outer rings 105, 109 may be installed using a slight clearance fit. An outer ring clamp nut 117 may be located between the outer face of the second outer ring 109 and the bearing cartridge 121. The outer ring clamp nut 117 together with the bearing cartridge protrusion 139 may help to secure the first and second bearings inside the bearing cartridge 121 to prevent axial movement of the outer rings 105, 109 in relation to the bearing cartridge 121. Radial movement of the outer rings 105, 109 in relation to the bearing cartridge 121 may be prevented due to the clamping force applied between the outer ring clamp nut 117 and the bearing cartridge protrusion 139.

The bearing cartridge 121 may be connected to the housing 119 with a plurality of fasteners 129.

The inner rings 107, 111 are fitted around a shaft 103. The inner rings 107, 111 may be fitted to the shaft using a press-fit, an interference fit, or a line-to-line contact fit, or may be fitted to the shaft by any method known in the art. Typically, the inner rings 107, 111 may be fitted to the shaft 103 at an emplacement temperature, which may be in the range of approximately 55° F. to 80° F. The inner rings 107, 111 may be fitted to the shaft 103 so as to prevent radial movement of the inner rings 107, 111 with respect to the shaft 103. A shaft nut 115 may be disposed on the outside face of the second bearing to help secure the first and second bearings to the shaft 103. The inner rings 107, 111 may be tightly clamped together by the shaft nut 115 and a protruding portion of the shaft 103, so as to prevent axial movement of the inner rings 107, 111 with respect to the shaft 103.

An spacer 123 may be located between outer rings 103, 109 of the first and second bearings. The spacer 123 may be composed of a material having a CTE similar to that of the bearing rings 103, 105, 107, 109. The spacer 123 may have a low thermal conductivity, in order to reduce the amount of heat that is transferred to components in contact with the spacer 123. By reducing the amount of heat that is transferred to components in contact with the spacer 123, the amount of heat that may be added or removed from the spacer 123 to affect the preload is reduced. One type of material that may be used for the spacer 123 are stainless steels, having a high CTE of approximately 7-9.6 μin/in/° F. and a low thermal conductivity of approximately 8-10 btu-ft/hr/ft$^2$/° F.

A load sensor 127 may be installed between the first outer ring 105 and the bearing cartridge protrusion 139. The load sensor 127 may measure the force exerted between the first outer ring 105 and the bearing cartridge protrusion 139, and may be used to estimate the amount of preload in the preloaded bearing assembly 101. The load sensor 127 may be any type of load sensor. Ideally, the load sensor 127 may be a circular force transducer. The load sensor 127 may have an analog or a digital output. The output of the load sensor 127 may be connected to the controller or switch, discussed further with respect to FIG. 10. Methods of estimating the preload of a duplex bearing system as a function of readings from a load sensor 127 are known in the art.

Alternatively, temperature sensors may be used to estimate the preload of the duplex bearing systems of FIGS. 1a, 1b, and 2-5. The preload of the duplex bearing system 101 may be estimated by sensing the temperature of the outer rings 105, 109, the spacer 123, and the inner rings 107, 111. For many systems, it may be acceptable to estimate the preload of the duplex bearing system 101 by sensing the temperature of the outer rings 105, 109 and the spacer 123. The temperature sensors are not shown in FIGS. 1a, 1b, and 3-9; however, methods of installing temperature sensors are known in the art. If temperature sensors are present to measure the temperatures of at least the spacer 123 and the outer rings 105, 109, the load sensor 127 may not be necessary to adequately estimate the system preload. Methods of estimating the preload of a duplex bearing system as a function of temperature readings from the rings and spacers of rolling element bearings are known in the art.

A heat-conducting mount 131 may be located between the bearing cartridge 121 and the housing 119. The heat-conducting mount 131 may be any type of material having a high thermal conductivity. The heat-conducting mount 131 may be any shape or size. The heat-conducting mount 131 may pass through an aperture located in the bearing cartridge 121. A heat-conducting mount 131 which does not come into contact with the bearing cartridge 121 may provide efficient heat transfer, as heat from the bearing cartridge 121 may not be convectively transferred to the heat-conducting mount 131.

One portion of the heat-conducting mount 131 may be in thermal communication with the spacer 123. The opposite portion of the heat-conducting mount may be in thermal communication with a thermoelectric coupling (TEC) 133. The TEC 133 may be any type of thermoelectric device. The TEC 133 may use the Peltier effect, which may cause the TEC 133 to either transmit heat to or absorb heat from the heat-conducting mount 131. When a voltage is applied across the TEC 133, the TEC creates a temperature differential. Changing the sign of the voltage applied to the TEC 133 changes the direction of heat transfer to or from the spacer 123. Thus, by changing the voltage applied to the TEC 133, the spacer 123 may be heated or cooled. By heating or cooling the spacer 123, its axial dimension may be changed, thus, changing the preload of the preloaded bearing system 101. The voltage applied to the TEC 133 may be controlled by the controller or switch, discussed further with respect to FIG. 10.

An inner spacer 125 may be located between the inner rings 107, 111 of the first and second bearings. The inner spacer 125 may be placed between the inner rings 107, 111 of the first and second bearings to provide a space for the spacer 123 to be installed between the outer rings 105, 109. The inner spacer may be composed of any material, but may preferably be a material having a low CTE, so as to reduce the effect of the expansion and contraction of the inner spacer 125 due to changes in temperature on the preload of the preloaded bearing system 101. One type of material that may be used for the inner spacer 125 is Invar, having a CTE of less than 0.5 μin/in/° F. Alternatively, the inner spacer 125 may be composed of a material having properties similar to those of the bearing rings 105, 107, 109, 111.

Figure 2:
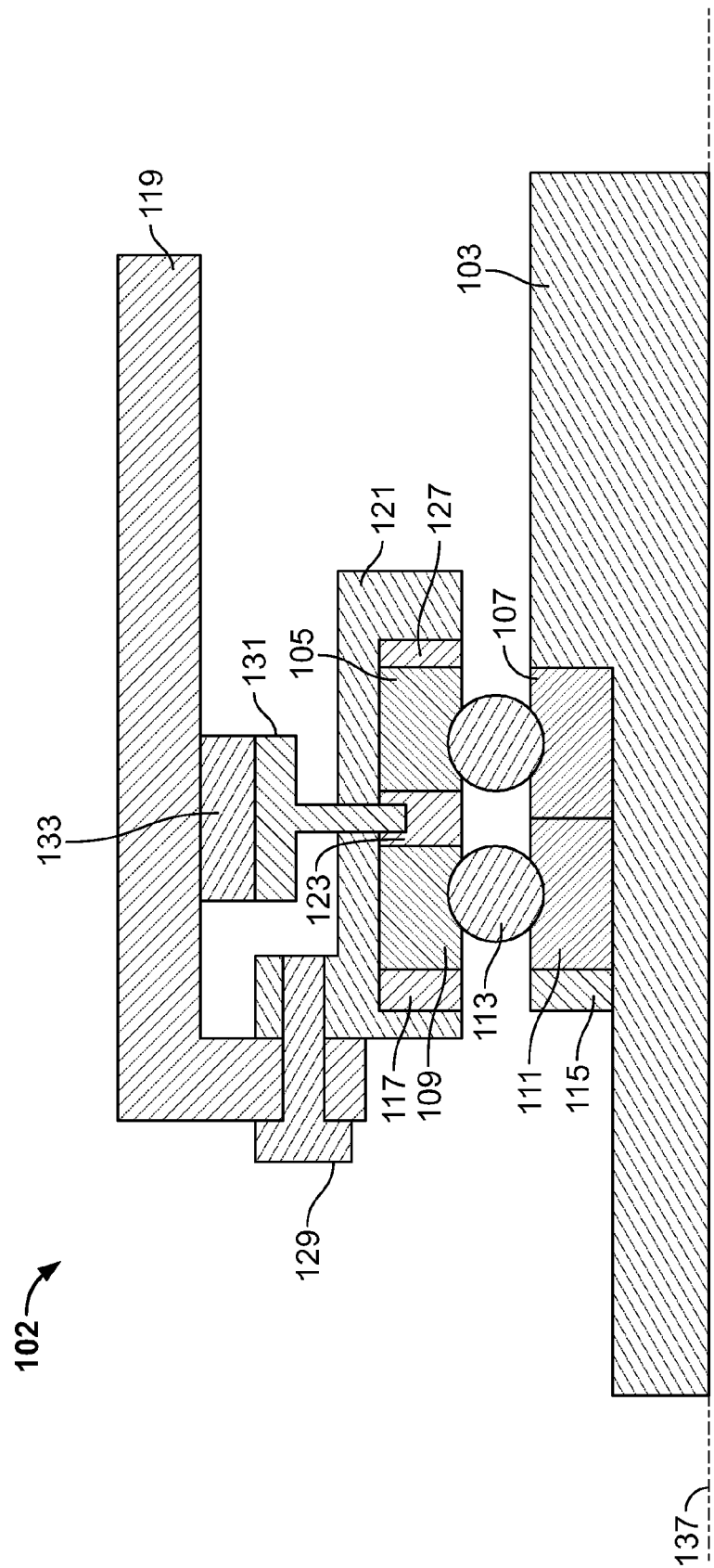
FIG. 2 is a cutaway view of rolling element bearing, according to a second embodiment.

An alternative embodiment is shown in FIG. 2. The preloaded bearing system 102 does not have the inner spacer 125 of FIGS. 1a, 1b. The outer rings 105, 109 may have an inset relative to the inner rings 107, 111. This inset on the outer rings 105, 109 may create a space in which an spacer 123 may be located. The insets of the outer rings 105, 109 may be created by machining off a portion of the outer rings 105, 109. The preloaded bearing system 102 may provide a smaller overall bearing width as compared to the systems 100, 101. Additionally, the absence of the inner spacer 125 may increase the accuracy of heat transfer and bearing stress models.

Figure 3:
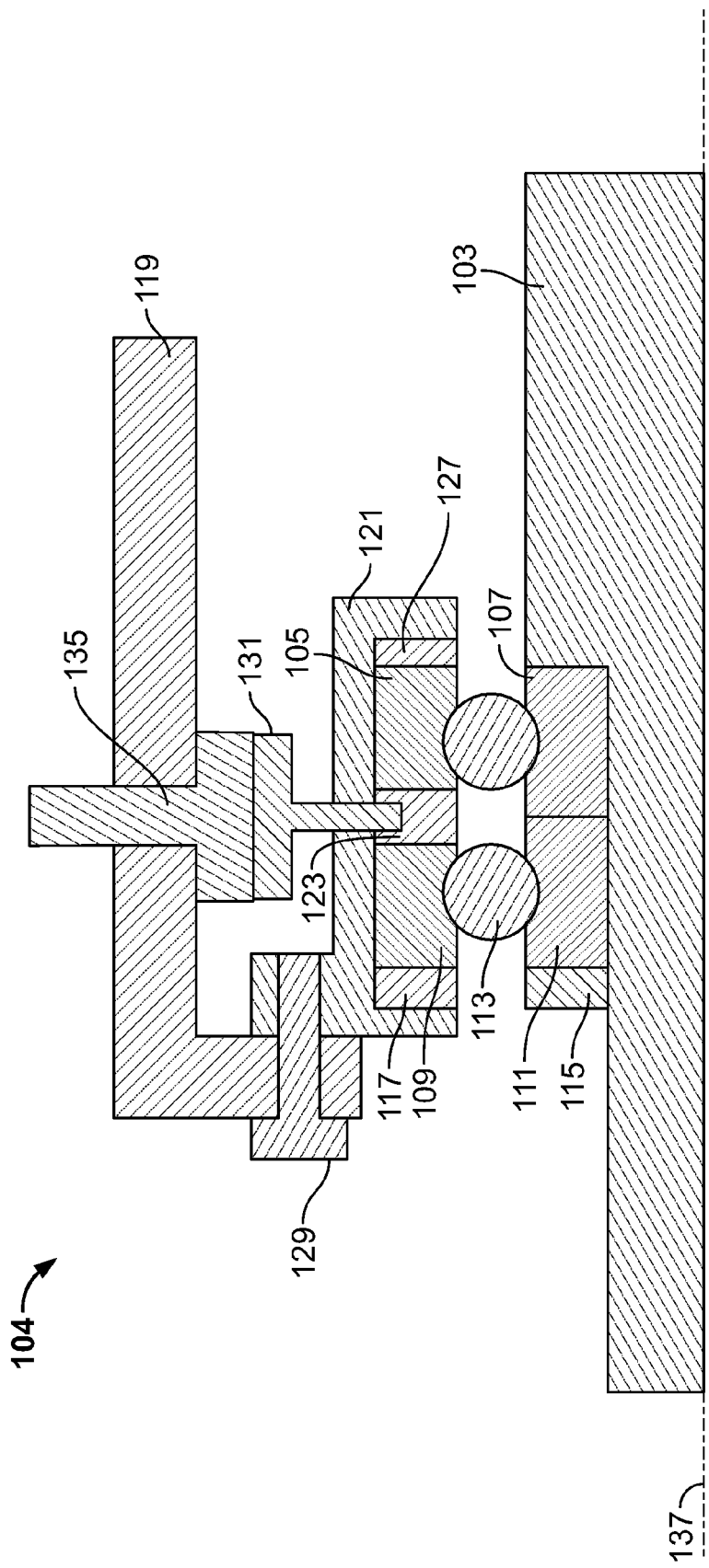
FIG. 3 is a cutaway view of rolling element bearing, according to a third embodiment.

Referring to FIG. 3, the TEC 133 may be replaced by a thermocouple 135. The thermocouple 135 may be composed of a material having a high thermal conductivity. The thermocouple 135 may be the same material as the heat-conducting mount 131. The thermocouple 135 may be in thermal communication with a region located outside of the housing 119 having a higher or lower temperature than the spacer 123. Heat may be transferred to or from the spacer 123, through the heat-conducting mount 131, and through the thermocouple 135. The heat transfer may be controlled by the controller or switch, described further with respect to FIG. 10.

Figure 4:
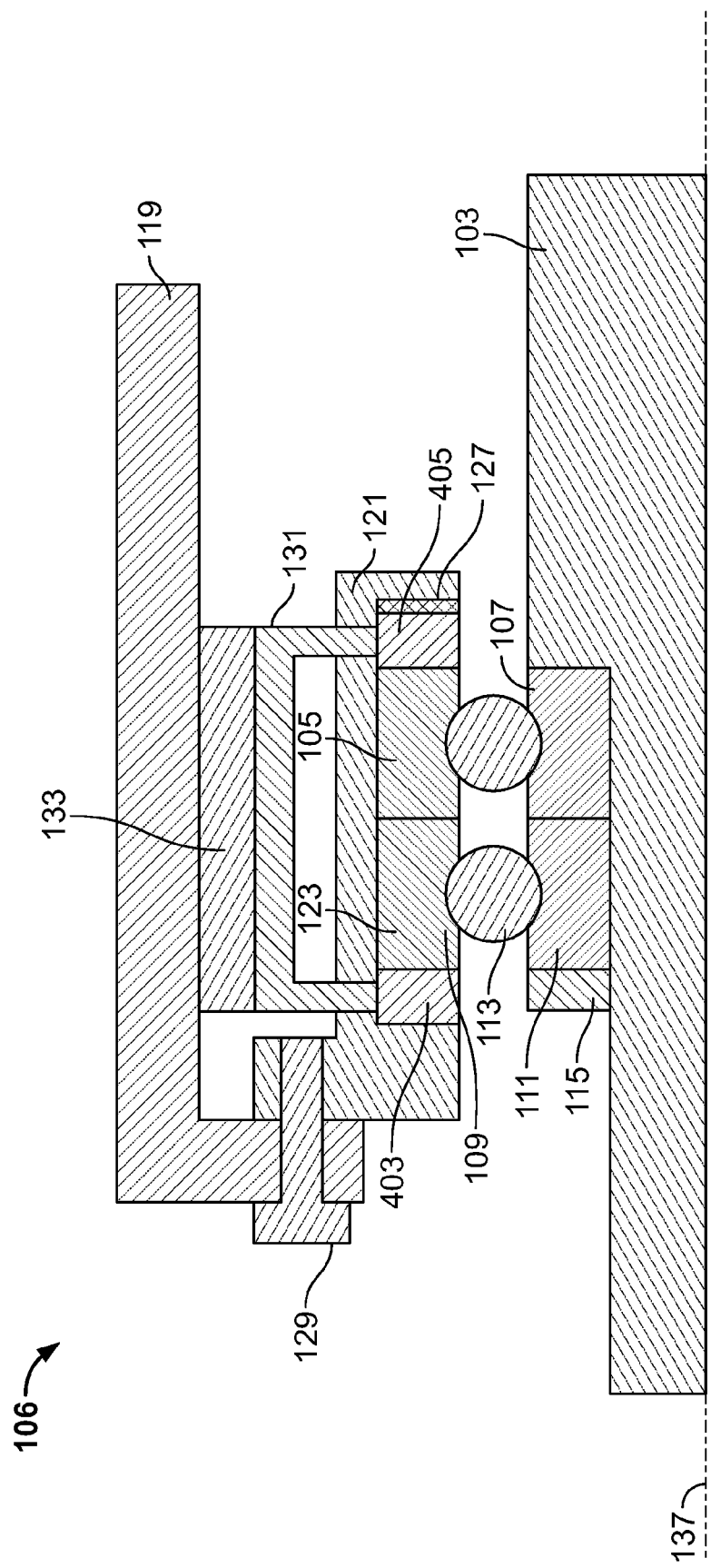
FIG. 4 is a cutaway view of rolling element bearing, according to a fourth embodiment.

Referring to FIG. 4, the spacer 123 may be replaced by two outside spacers 403, 405. The outside spacers 403, 405 may be composed of the same materials as the spacer 123. The outside spacers 403, 405 may each be in thermal communication with a heat-conducting mount 131. The heat-conducting mount may be in contact with a TEC 133. The TEC 133 may be as described with respect to FIGS. 1a, 1b.

Figure 5:
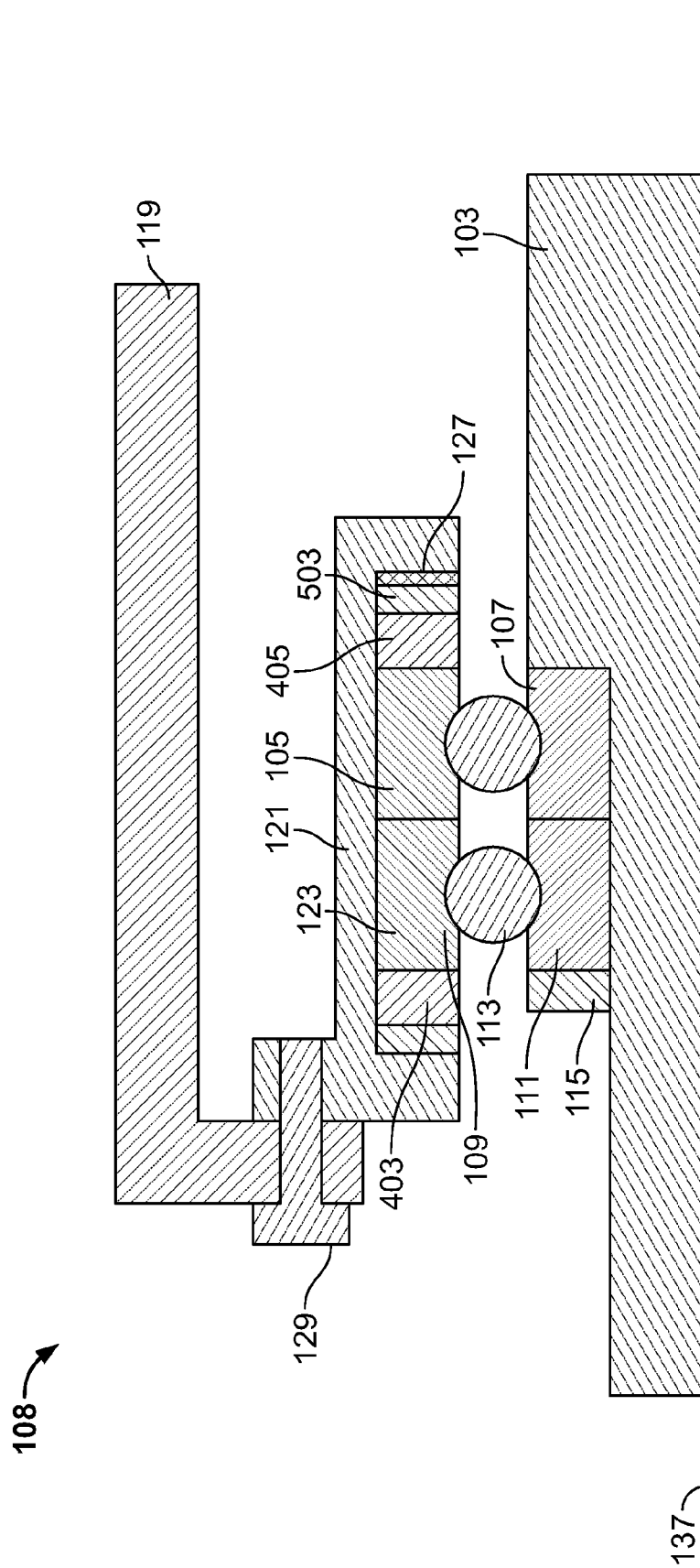
FIG. 5 is a cutaway view of rolling element bearing, according to a fifth embodiment.

Referring to FIG. 5, resistive heating elements 503 may be used in place of the heat-transfer mount 131 and the TEC 133 to heat the outside spacers 403, 405. For some systems, it may be necessary only to add heat to the spacers 403, 405. For these systems, resistive heating elements 503 may provide a less expensive alternative to the TEC 133 of FIGS. 1a, 1b, 3-4. In FIG. 5, a load sensor 127 may be located between the bearing cartridge 121 and a resistive heating element 503.

Figure 6:
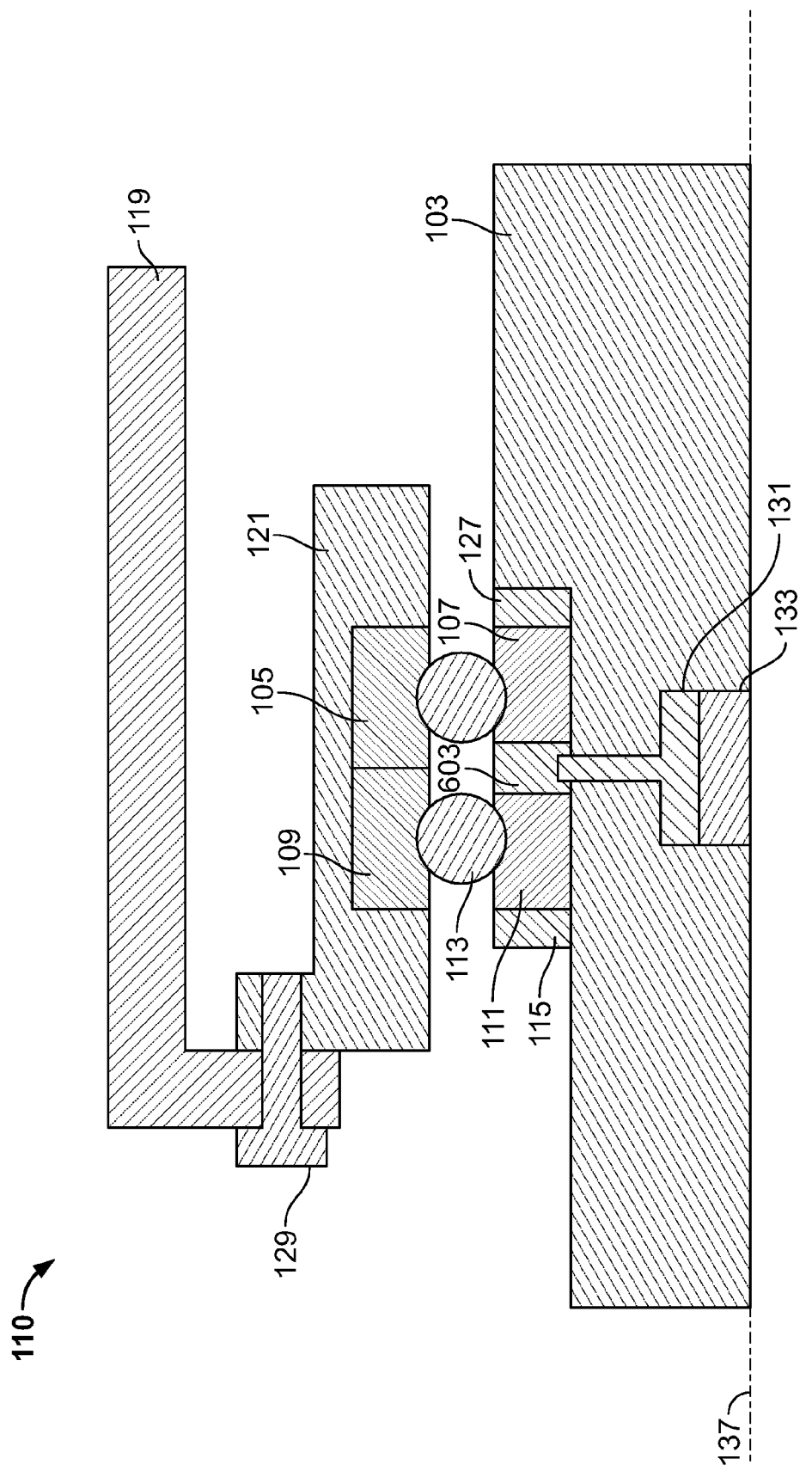
FIG. 6 is a cutaway view of rolling element bearing, according to a sixth embodiment.

Referring to FIG. 6, the preloaded bearing system 110 has a fixed shaft and fixed inner rings, and outer rings that rotate with the housing 119 around the rotational axis 137. Because the shaft 103 is fixed, the inner rings 107, 111 are fixed. The controls and connections may be more easily accomplished on the side of the bearing mechanism that is fixed. Thus, the spacer 603, heat-conducting mount 131, TEC 133, and load sensor 127 may be located on the inner ring side of the preloaded bearing system 110. The spacer 603 may be located between the inner rings 107, 111. The spacer 603 may be of a similar material as the spacer 123, described with respect to FIGS. 1a, 1b, 3-5. The load sensor 127 may be located between the inner ring 107 and the shaft 103. The heat-conducting mount 131 and the TEC 133 may be located in the shaft 103. The shaft 103 may be hollow, and the heat-conducting mount 131 and TEC may extend into the shaft 103. The connections for the load sensor 127 and the TEC 133 may also be located in the shaft 103. The connections are not shown in FIG. 6; however, methods of making these connections are known in the art. The components of preloaded bearing system 110 may function as described with respect to FIG. 1a.

Alternatively, temperature sensors may be used to estimate the preload of the duplex bearing systems of FIGS. 6-9. The preload of the duplex bearing system 101 may be estimated by sensing the temperature of the outer rings 105, 109, the spacer 603, and the inner rings 107, 111. For many systems, it may be acceptable to estimate the preload of the duplex bearing system 101 by sensing the temperature of the inner rings 107, 111 and the spacer 603. The temperature sensors are not shown in FIGS. 1a, 1b, and 3-9; however, methods of installing temperature sensors into duplex bearing systems are known in the art. If temperature sensors are present to measure the temperatures of at least the spacer 603 and the inner rings 107, 111, the load sensor 127 may not be necessary to adequately estimate the system preload.

Figure 7:
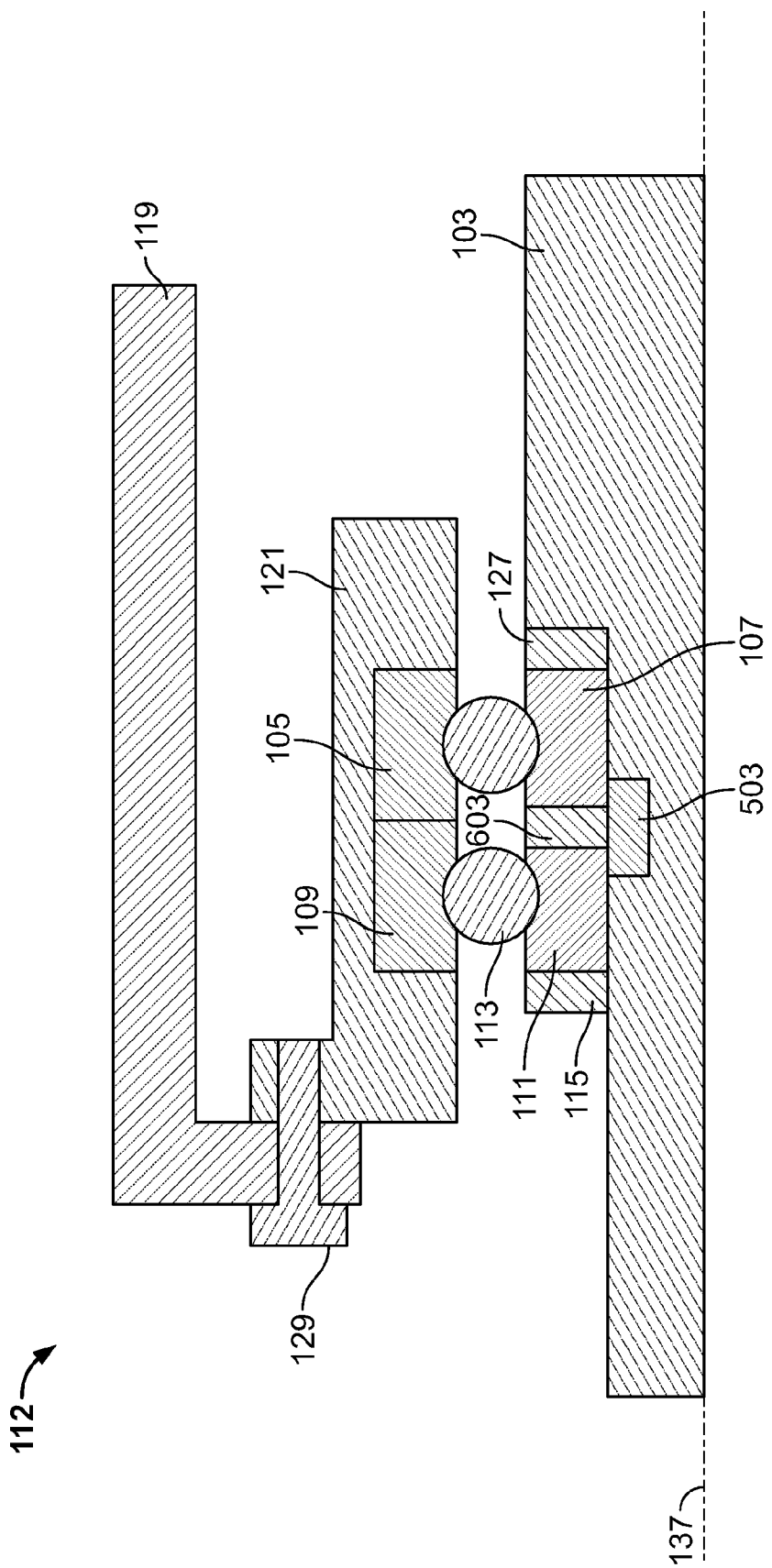
FIG. 7 is a cutaway view of rolling element bearing, according to a seventh embodiment.

Referring to FIG. 7, a resistive heating element 503 may be used to heat the spacer 603. For some systems, it may be necessary only to add heat to the spacer 603. For these systems, resistive heating element 503 may provide a less expensive alternative to the TEC 133 of FIGS. 1a, 1b, 3-4, 6, 8. A load sensor 127 may be located between the bearing cartridge 121 and a resistive heating element 503. Alternatively, temperature sensors may be used to estimate preload, by locating temperature sensors on at least the inner rings 107, 111 and the spacer 603 as described with respect to FIG. 6.

Figure 8:
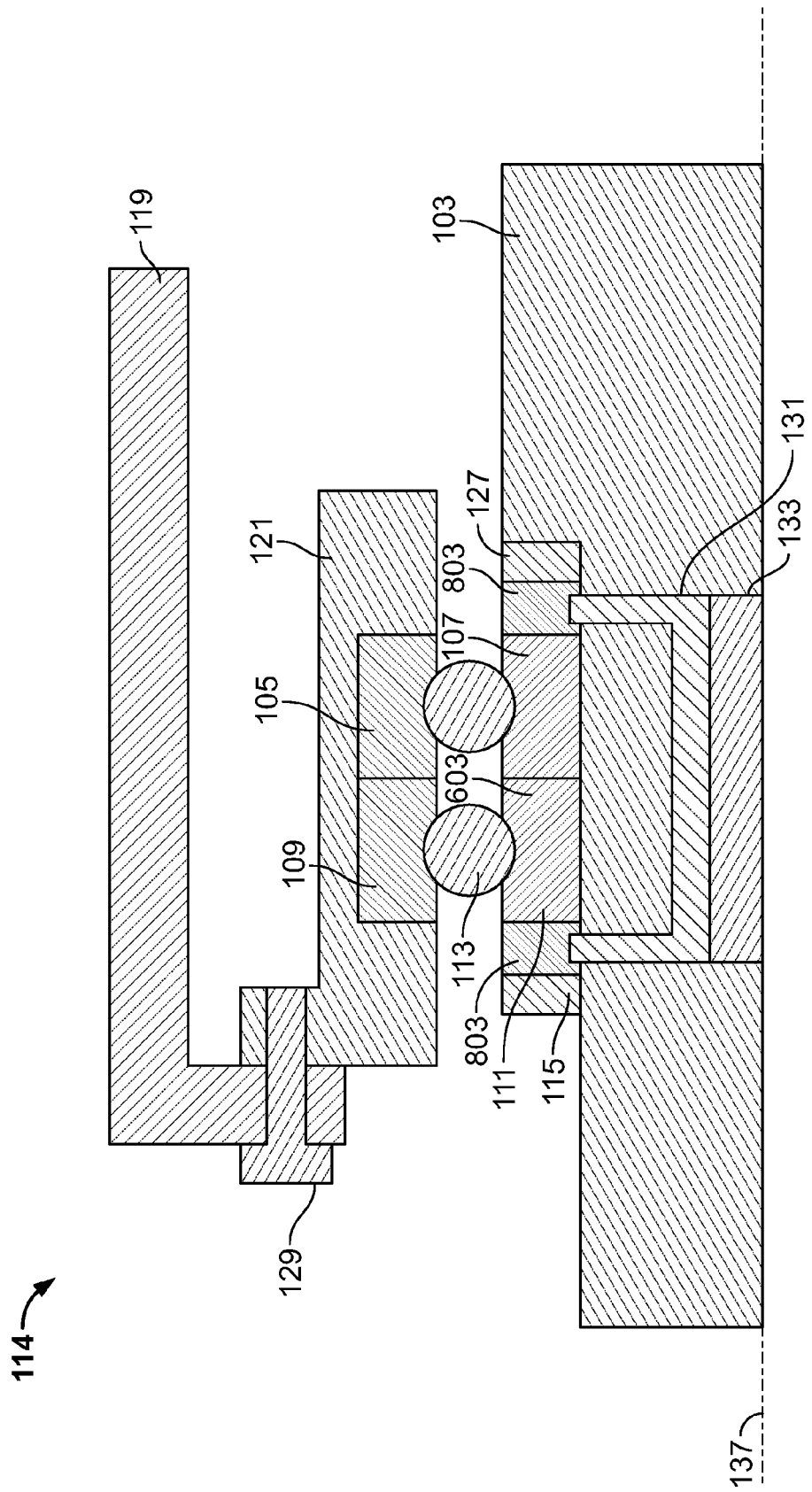
FIG. 8 is a cutaway view of rolling element bearing, according to a eighth embodiment.

Referring to FIG. 8, spacers 803 located on the outer faces of the inside rings 107, 111 may be used to control the preload of the preloaded bearing system 114. Heat is transferred to and from the outer inside spacers 803 by the TEC 133 through the heat-conducting mount 131, as described with respect to FIG. 1a. A load sensor 127 may be located between the shaft 103 and a spacer 803. Alternatively, temperature sensors may be used to estimate preload, by locating temperature sensors on at least the inner rings 107, 111 and the spacers 803 as described with respect to FIG. 6.

Figure 9:
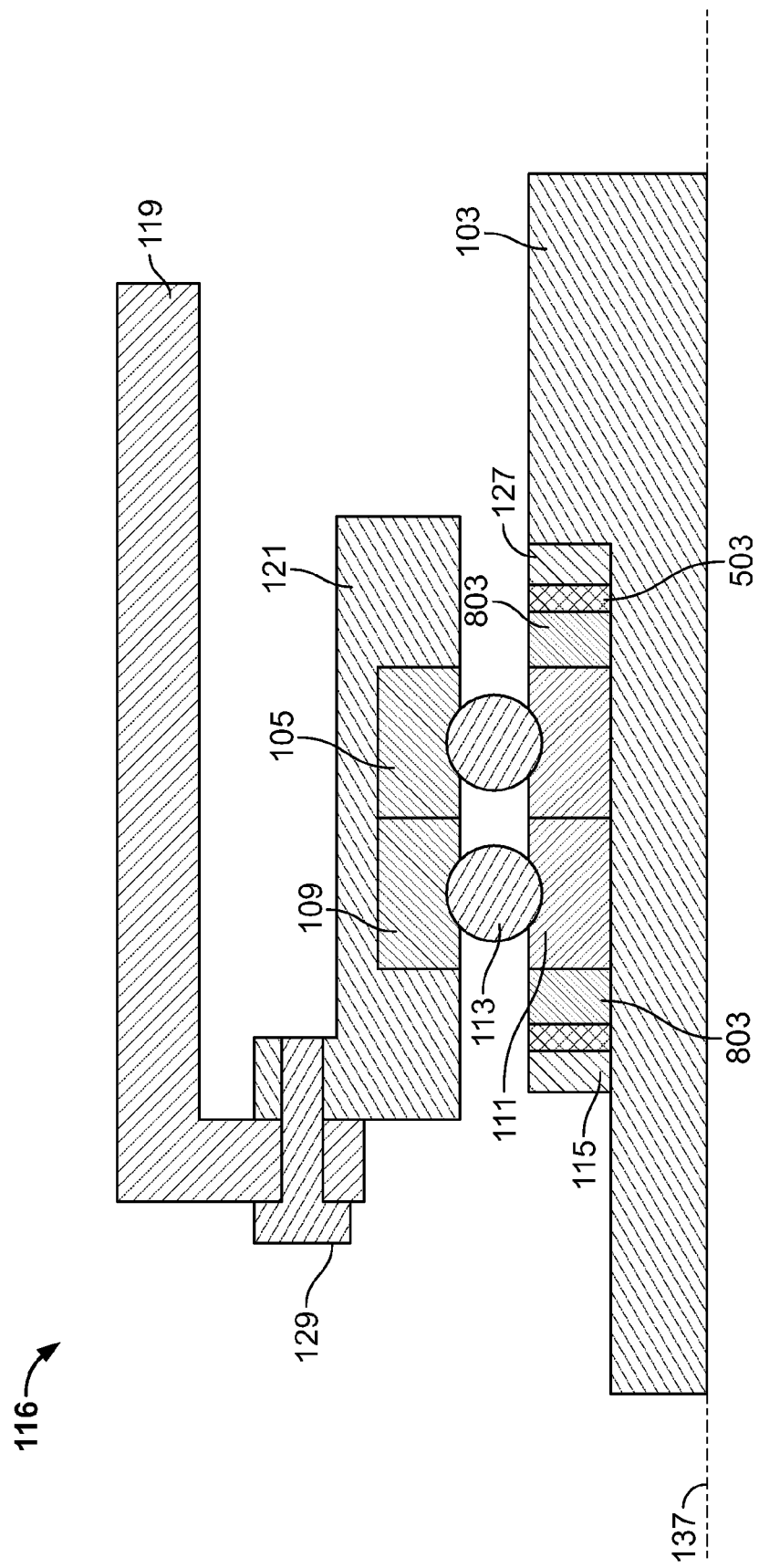
FIG. 9 is a cutaway view of rolling element bearing, according to a ninth embodiment.

Referring to FIG. 9, resistive heating elements 503 may be used to heat the spacers 803. For some systems, it may be necessary only to add heat to the spacers 803. For these systems, resistive heating element 503 may provide a less expensive alternative to the TEC 133 of FIGS. 1a, 1b, 3-4, 6, 8. A load sensor 127 may be located between the shaft 103 and a resistive heating element 503. Alternatively, temperature sensors may be used to estimate preload, by locating temperature sensors on at least the inner rings 107, 111 and the spacer 803 as described with respect to FIG. 6.

Figure 10:
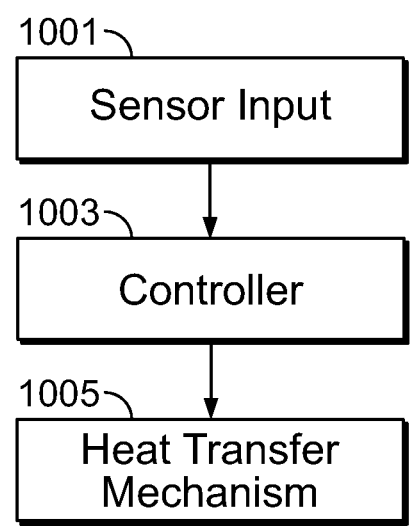
FIG. 10 is a flowchart for a method for controlling preload of a rolling element bearing, according to an embodiment.

FIG. 10 shows an example of a method of controlling the preload for a duplex bearing system. The sensor input 1001 may be a sensor input from a load sensor or a temperature sensor, or a plurality of load sensors or temperatures sensors. The controller 1003 may be a card controller dedicated to the control of the preloaded bearing system. Alternatively, the controller 1003 may be an onboard computer located on the device into which the preloaded bearing system is incorporated, or it may be a switching device. The heat transfer mechanism 1005 may be a TEC, a thermocouple, or a resistive heating element, as described with respect to FIGS. 1a, 1b, 3-9. The controller 1003 may contain control logic by which the controller 1003 determines the preload based on the sensor input 1001 and signals the heat transfer mechanism to transfer heat to or from the spacers as needed to control the preload. Alternatively, the control logic of the controller 1003 may be a switch or a system of switches that open and close to transfer heat to or from the spacers when the sensor input 1001 is above or below predetermined setpoints. The controller 1003 may receive the sensor input 1001. The controller 1003 may then signal the heat transfer mechanism 1005 to transfer heat to or from the spacers according to a predetermined control logic.

The preloaded bearing systems 100, 101, 102, 104, 106, 108, 110, 112, 114 operate to reduce changes in preload due to temperature fluctuations. Because the preload may be estimated by directly monitoring the load sensors or the temperature sensors, and the spacers may be heated or cooled based on sensor readings, the system provides improved control of preload over a wide range of temperatures. Further, because the preload may be directly controlled, and, thus, the range of preload variations on the bearings may be reduced, the maximum preload is also reduced. Because the maximum preload is reduced, the stresses on the bearing components may also be reduced. Therefore, the bearings may be reduced in size, cost, and weight, because the bearings are subjected to a lesser range of bearing preload stresses. Additionally, bearing preload control also improves bearing drag torque and reduces fatigue stresses on the bearings.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:
1. An apparatus for controlling a preload of a preloaded duplex bearing system, comprising:
    a shaft, wherein a rotational axis is located along an axis of the shaft;
    a plurality of rolling element bearings, the rolling element bearings each comprising:
        an inner ring;
        an outer ring; and
        a plurality of rolling elements between the outer ring and inner ring;
    at least one sensor;
    a bearing cartridge containing the plurality of rolling element bearings;
    at least one spacer, wherein the at least one spacer is axially adjacent to at least one of the outer rings and exerts an axial preload force thereon;
    a heat transfer mechanism thermally coupled to the at least one spacer, the heat transfer mechanism comprising a heat conducting mount extending through the bearing cartridge and into the at least one spacer; and
    a controller, having a control logic, wherein the controller receives at least one input from the at least one sensor indicative of the axial preload force, and wherein the controller sends at least one output to the heat transfer mechanism based on the at least one input from the at least one sensor to transfer heat to or to remove heat from the at least one spacer to adjust the axial width thereof and reduce changes in the axial preload force due to temperature fluctuations during operation of the preloaded duplex bearing system.

2. The apparatus of claim 1, wherein the at least one sensor is a force transducer.

3. The apparatus of claim 1, wherein the at least one sensor is a temperature sensor.

4. The apparatus of claim 1, wherein the heat transfer mechanism comprises:
wherein the at least one heat conducting mount is composed of a thermally conductive material, and wherein the at least one heat conducting mount is in thermal communication with the at least one spacer; and
at least one thermoelectric coupling in thermal communication with the at least one heat conducting mount, the at least one thermoelectric coupling comprising:
a thermoelectric circuit, wherein the thermoelectric circuit transfers heat from the at least one heat conducting mount upon receipt of a first voltage, and wherein the thermoelectric circuit transfers heat to the heat conducting mount upon receipt of a second voltage, wherein the second voltage has an opposite sign to the first voltage, and wherein the first or second voltage is applied across the thermoelectric circuit based on at least one output of the controller.

5. The apparatus of claim 1, wherein the heat transfer mechanism comprises:
at least one resistive heating element in thermal communication with the at least one spacer, wherein the at least one resistive heating element transfers heat to the at least one spacer upon receipt of at least one output from the controller.

6. The apparatus of claim 1, wherein the controller comprises:
at least one switching relay, wherein the at least one switching relay receives at least one input from the at least one sensor, and wherein the switching relay provides an output from the controller to the heat transfer mechanism upon receipt of at least one input from the at least one sensor having a value above or below a setpoint.

7. The apparatus of claim 1, wherein the controller comprises:
a processing unit; and
data storage for storing at least the control logic, wherein the control logic estimates the preload of the duplex bearing system based on the at least one input from the at least one sensor, wherein the control logic determines that heat should be transferred to or from the at least one spacer, and wherein the control logic instructs the controller to send at least one output to the heat transfer mechanism.

8. The apparatus of claim 1, wherein the at least one spacer comprises a single spacer located between the outer rings of two of the rolling element bearings, wherein the inner rings of the rolling element bearings rotate with the shaft around the rotational axis.

9. The apparatus of claim 1, wherein the at least one spacer comprises two spacers located along an outer face of the outer rings of two of the rolling element bearings, and wherein the inner rings of the rolling element bearings rotate with the shaft around the rotational axis.

10. An apparatus, comprising:
a shaft;
a duplex bearing assembly including inner rings, outer rings, rolling elements disposed between the inner rings and the outer rings, and a bearing cartridge in which the outer rings and the rolling elements are disposed;
a spacer disposed axially adjacent and exerting an axial preload force on the outer rings;
a heat transfer mechanism thermally coupled to the spacer and configured to selectively transfer heat thereto, the heat transfer mechanism comprising:
a heat conducting mount extending through a sidewall opening provided in the bearing cartridge and to the spacer; and
at least one of a thermoelectric coupling and a thermocouple in thermal communication with the heat conducting mount; and
a controller operably coupled to the heat transfer mechanism and configured to cause the heat transfer mechanism to transfer heat to the spacer to increase the axial width thereof when the axial preload force exerted by the spacer on at least one of the outer rings is determined to be less than a first predetermined level.

11. An apparatus according to claim 10 wherein the heat transfer mechanism is further configured to selectively transfer heat away from the spacer, and wherein the controller is further configured to cause the heat transfer mechanism to transfer heat away from the spacer to decrease the axial width thereof when the axial preload force exerted by the spacer on at least one of the outer rings is determined to be greater than a second predetermined level.

12. An apparatus according to claim 10 further comprising a sensor positioned axially adjacent the spacer or at least one of the outer rings and configured to measure a parameter indicative of the axial preload force exerted by the spacer on at least one of the outer rings.

13. An apparatus according to claim 12 wherein the sensor is contained within the bearing cartridge.

14. An apparatus according to claim 10 further comprising a housing to which the bearing cartridge and the thermoelectric coupling are fixedly coupled, the heat conducting mount coupled to the thermoelectric coupling substantially opposite the housing and extending radially inward therefrom, through the sidewall of the bearing cartridge, and to the spacer.

15. An apparatus according to claim 10 wherein the heat conducting mount is at least partially embedded within the spacer.

16. An apparatus, comprising:
a stationary shaft;
a duplex bearing assembly including inner rings, outer rings, rolling elements disposed between the inner rings and the outer rings, and a bearing cartridge in which the outer rings and the rolling elements are disposed;
a spacer disposed axially adjacent and exerting an axial preload force on at least one of the inner rings, the spacer fixed to the stationary shaft;
a heat transfer mechanism thermally coupled to the spacer and configured to selectively transfer heat thereto, the heat transfer mechanism incorporated into the stationary shaft; and
a controller operably coupled to the heat transfer mechanism and configured to cause the heat transfer mechanism to transfer heat to the spacer to increase the axial width thereof when the axial preload force exerted by the spacer on the inner rings is determined to be less than a first predetermined level;
wherein the heat transfer mechanism comprises:
a heat conducting mount embedded within the stationary shaft; and
at least one of a thermoelectric coupling and a thermocouple in thermal communication with the heat conducting mount.

* * * * *